United States Patent

[11] 3,603,617

| [72] | Inventor | Joe C. Lochridge |
| | | Houston, Tex. |
| [21] | Appl. No. | 824,866 |
| [22] | Filed | May 15, 1969 |
| [45] | Patented | Sept. 7, 1971 |
| [73] | Assignee | Brown & Root, Inc. |
| | | Houston, Tex. |

[54] METHOD AND APPARATUS FOR MAKING SUBMERGED CONDUIT CONNECTIONS
11 Claims, 11 Drawing Figs.

[52] U.S. Cl. .................................................. 285/24,
61/72.3, 166/0.6, 285/31, 285/368, 285/379
[51] Int. Cl. ...................................................... F16l 35/00
[50] Field of Search .......................................... 285/31, 32,
24, 61, 27, 368, 18, 379; 61/72.1, 72.3; 29/237;
166/0.6; 248/49; 138/106; 137/343, 372

[56] References Cited
UNITED STATES PATENTS

| 1,642,146 | 9/1927 | Fichtner et al. | 285/61 |
| 1,678,127 | 7/1928 | Smith | 61/72.3 |
| 1,869,778 | 8/1932 | Roberts | 61/72.3 |
| 1,874,081 | 8/1932 | Burrows | 61/72.3 |
| 1,999,791 | 4/1935 | Siegfried | 248/49 |
| 2,399,312 | 4/1946 | Augustine | 29/244 X |
| 2,005,699 | 6/1935 | Gottwald | 285/61 |
| 3,267,682 | 8/1966 | Robley | 61/72.3 |
| 3,448,799 | 6/1969 | Ahlstone | 166/0.5 |
| 3,481,396 | 12/1969 | Williams et al. | 285/137 X |

FOREIGN PATENTS

| 828,940 | 2/1960 | Great Britain | 285/18 |
| 873,886 | 8/1961 | Great Britain | 285/32 |

*Primary Examiner*—Dave W. Arola
*Attorney*—Burns, Doane, Swecker & Mathis

ABSTRACT: A submerged assembly including longitudinally spaced first and second conduit means, extending between the conduit means and a template carried by the first and second conduit means. By removing the spacer means, a fitting may be installed between the first and second conduit means, with the alignment of the fitting being facilitated by the template means.

Jack-type flange fittings and telescoping joints may be employed to facilitate the removal of the spacer means and subsequent installation of the fitting.

A method for installing a submerged fitting wherein a conduit means is initially positioned with conduit portions spaced by removable spacer means. When the conduit means is disposed in its submerged location, the spacer means is removed. A template carried between the conduit portions facilitates the positioning of a fitting between the conduit portions.

PATENTED SEP 7 1971

INVENTOR
JOE C. LOCHRIDGE

BY Burns, Doane, Benedict, Swecker, & Mathis
ATTORNEYS

INVENTOR
JOE C. LOCHRIDGE

PATENTED SEP 7 1971

INVENTOR
JOE C. LOCHRIDGE

BY *Burns, Doane, Benedict, Swecker & Mathis*
ATTORNEYS

METHOD AND APPARATUS FOR MAKING SUBMERGED CONDUIT CONNECTIONS

GENERAL BACKGROUND, OBJECTS AND SUMMARY OF INVENTION

The laying of pipelines in submerged locations engenders substantial operating problems.

Particular problems may be encountered in attempting to provide a submerged pipeline provided with a fitting such as a T-fitting valve assembly, or other special fitting having a protuberance extending laterally beyond the dimensions of the pipeline body.

Difficulties arise in laying a pipeline with such a fitting present because the protuberance or dimensions of the fitting may interfere with the transition of the pipeline from a floating vessel to a submerged surface.

Attempts to install a fitting in a submerged location may be complicated if it is necessary to cut out a portion of a welded pipeline and install the fitting. Such underwater cutting operations are difficult to perform, expensive and time consuming. In addition, the cutting operation itself may be hazardous.

In recognition of fitting installation problems of the type discussed, it is a principal object of the invention to provide a technique and apparatus for installing underwater fittings without interfering with a pipeline laying operation and while minimizing under water manipulative efforts.

It is a further object of the invention to provide such apparatus and techniques which may be safely and effectively accomplished even under condition where underwater visibility is poor.

In the context of this fitting installation concept, it is a related object of the invention to provide a coupling apparatus which facilitates the manipulating of coupling members into appropriate but spaced alignment to facilitate the installation of a seal or gasket between the coupling members.

Another independently significant object of the invention is to provide a method which facilitates the installation of a submerged fitting in a submerged conduit.

A further and related object of the invention is to provide such a fitting installation method which facilitates the installation of large, heavy, or cumbersome fittings.

It is also an object of the invention to provide such a method with enables a fitting of this nature to be installed in a submerged location where it would be awkward or difficult to incorporate the fitting in a conduit as it was being initially laid on a submerged surface.

In accomplishing at least some of the foregoing objects, the invention contemplates an apparatus comprising first conduit means, second conduit means, and removable spacer means interconnecting the first and second conduit means. A template means carried by the first and second conduit means is operable to align fitting means substituted for the spacer means, with the fitting means being aligned longitudinally between the first and second conduit means.

An independently significant apparatus concept of the invention entails the assembly of the first conduit means, second conduit means, template means and substituted fitting means.

In the context of either of the foregoing combinations, independently significant facets of the invention relate to the inclusion of jack-type flange fittings and/or axially telescoping joints incorporated in either or both of the spacer means or fitting means. In addition, skids or rails may be advantageously carried by the template means to facilitate longitudinal positioning of the fitting means.

Still another independent facet of the invention relates to a method of incorporating a fitting in submerged conduit means. In the practice of this method, an assembly is lowered from floating vessel means toward a submerged surface. This assembly includes longitudinally spaced, first and second conduit means and removable spacer means interconnecting the first and second conduit means. A template means extends from the first conduit means toward the second conduit means and is generally fixedly connected with the first and second conduit means.

The assembly is positioned generally adjacent the submerged surface and the spacer means is then removed. A fitting is positioned in aligned cooperation with the template means and located generally longitudinally between the first and second conduit means. The alignment of the fitting means with the template means serves to ensure the generally axial alignment of the fitting means with the first and second conduit means. As a further ramification, a portion of the fitting means may be telescopingly extended to place the fitting means in connectable cooperation with the first and second conduit means.

DRAWINGS

In describing the invention, reference will be made to preferred embodiments illustrated in the appended drawings.

In the Drawings:

FIG. 3 in the schematic sequence, illustrates coupling components during the initiation of the coupling operation where the coupling elements are spaced and may be somewhat misaligned;

FIG. 4, in the coupling sequence, illustrates the manner in which coupling jack elements are operated independently of, but in cooperation with, flange-securing bolts to provide a rigidified assembly where the opposing faces of the coupling members are locked in spaced but generally parallel alignment;

FIG. 5, in the schematic sequence, illustrates the installation of a gasket or seal between the aligned and rigidified coupling members;

FIG. 6 in the schematic sequence, illustrates the manner in which the positioned gasket may be locked in aligned position with a connecting bolt;

FIG. 7, in the schematic sequence, illustrates the terminal coupling step wherein the fastening bolts and jack elements are independently manipulated in a properly coordinated manner to maintain the general stability of the assembly, while drawing the coupling members into sealing engagement with opposite sides of the gasket so as to cause the conduit means associated with the flange-coupling elements to be brought into sealed and fluid-communicating relationship;

STRUCTURAL DETAILS OF FLANGE-TYPE COUPLING EMBODIMENT

Figure 1:
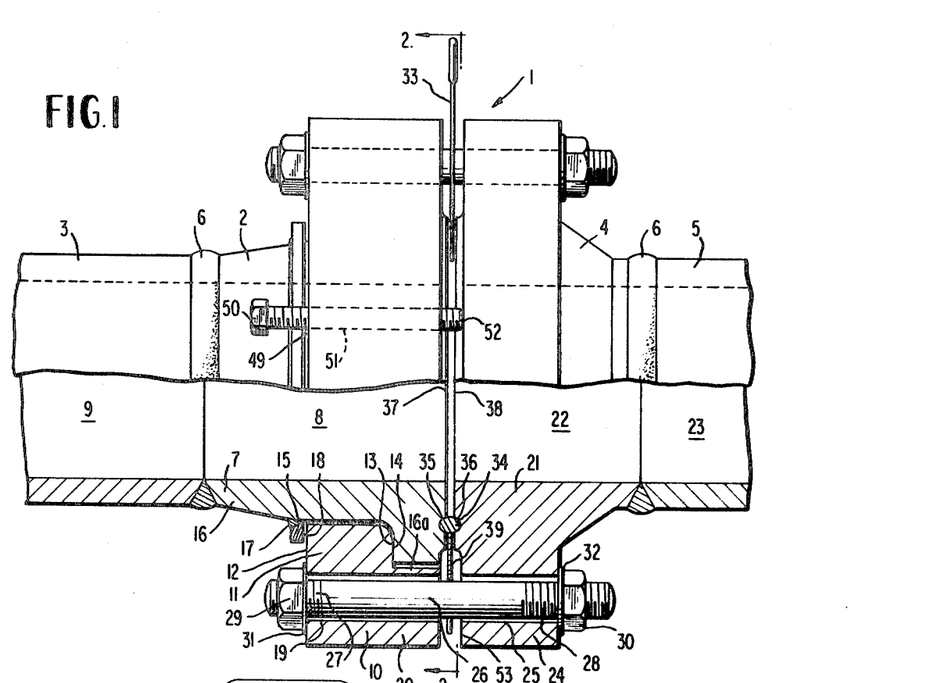
FIG. 1 provides a partially sectioned, fragmentary, side elevational view of a flange-type coupling between submerged conduit portions, which coupling may be utilized advantageously in the practice of the present invention.
Figure 2:
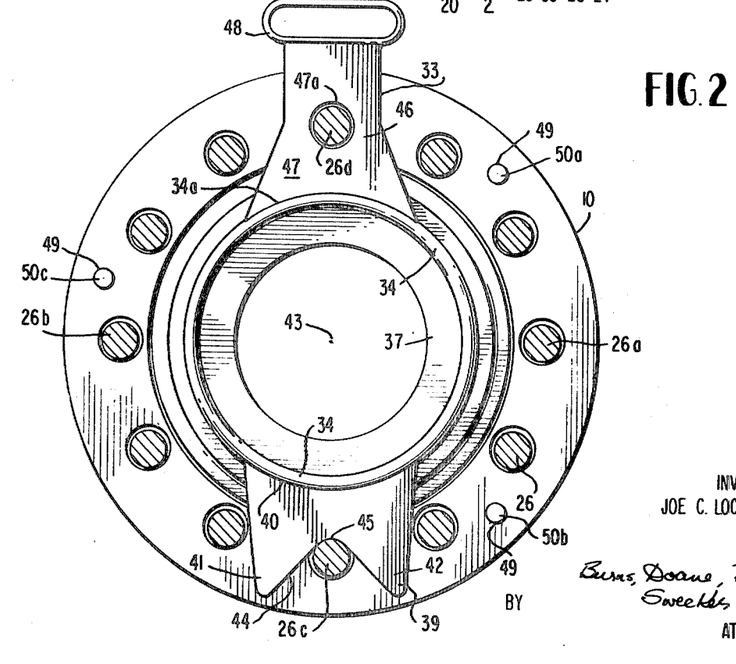
FIG. 2 provides a transverse sectional view of the FIG. 1 coupling assembly as viewed along the section line 2—2 of FIG. 1.

FIGS. 1 and 2 illustrate structural details of a preferred flange-type coupling assembly 1, which may be utilized in practicing this fitting installation invention.

Coupling 1 comprises, as major components, first coupling means 2 connected with a first conduit or pipeline portion 3 and an axially opposed, second coupling means 4 connected to a second conduit or pipeline portion 5.

As shown shown in FIG. 1, coupling means 2 is connected in coaxial alignment with conduit section 3 as, for example, by the schematically shown welding zone 6. Similarly, coupling means 4 is connected in coaxial alignment with conduit means 5 by a welding zone 6. The conduit means 3, coupling means 2, coupling means 4, and conduit means 5 are all, when interconnected, disposed in substantially coaxial alignment.

Conduit means 3, coupling means 2, coupling means 4, and conduit means 5 may all be substantially cylindrical in cross section, as shown in the illustrated embodiment. However, cross-sectional configurations, wall thickness, etc. may vary substantially in practicing the invention.

First coupling means 2 includes a generally cylindrical body portion 7 having a first passage 8 extending generally coaxially therethrough. Passage 8 defines a coaxial continuation of central passage 9 of conduit means 3.

A generally annular, first flange means 10 is mounted on body means 7 for rotation about the first passage 8. As shown in FIG. 1, flange 10 is generally L-shaped in cross section.

A leg potion 11 of flange means 10, extending generally radially of the central axis of passage 8, provides axially spaced abutment walls 12 and 13. Wall 13 is abuttingly engageable with an abutment wall 14 defined and carried by body means 7. Wall 14 extends generally radially outwardly of body means 7, with respect to the central axis of passage 8. An annular securing ring 15 is fixedly mounted on the generally cylindrical portion 16 of body means 7. Ring 15 may be secured as, for example, by a welding zone 17, to body portion 16, and provides an abutment wall 18. Abutment wall 18 projects radially outwardly of the axis of passage 8 and is operable to abuttingly engage abutment wall 12 of flange means 10.

Abutment walls 14 and 18 are spaced longitudinally of the assembly 1 by a distance slightly exceeding the longitudinal distance between flange abutment walls 12 and 13. In this manner, the walls 18 and 14 function to prevent any significant axial movement of flange means 10 without impeding rotation of the flange means 10 about the body means 7.

A plurality of bolt holes or fastener-receiving means 19 are spaced circumferentially about and carried by the flange means 10. As shown in FIG. 2, the various bolt-receiving holes 19 are generally equally spaced about flange means 10, and extend generally longitudinally of the assembly 1, i.e. parallel to the central axis of passage 8. Thus, holes 19 are mutually parallel.

As shown in FIG. 1, the various bolt receiving holes 19 project longitudinally of the coupling means 2 through the generally axially extending, annular leg portion 20 of flange means 10. Leg portion 20 overlaps, but does not project, radially beyond a radially extending flange portion 16a of body means 7. Leg portion 20 is freely rotatable about flange portion 16a.

Second coupling means 4 is defined by a generally cylindrical second body means 21. Body means 21 is provided with a central passage 22 extending longitudinally therethrough. Second passage means 22 defines a coaxial extension of the central passage 23 of conduit means 5. As shown in FIG. 1, with the coupling 1 connected, the various passage means 9, 8, 22 and 23 are generally coaxially aligned and of substantially the same cross-sectional configuration. Generally, and as is shown in FIG. 1, the cross section of these passage means would be circular in nature.

A generally radially extending flange portion 24 of second body means 21 is provided with a plurality of second bolt receiving or fastener-receiving holes 25. Holes 25 are located on the flange portion 24 of body means 21 so as to define axial continuations of the bolt holes 19 of the flange means 10, when this flange means is rotated to align the bolt holes 19 with the bolt holes 25. Thus, the bolt holes 25 are of substantially the same size in cross section as the bolt holes 19, are mutually parallel, and extend generally parallel to the central axis of passage means 22 and are generally circumferentially and equally spaced about flange 24.

Coupling 1 also includes a plurality of fastener elements or stud bolts 26.

As shown in FIG. 1, each bolt 26 may be circular in cross section and slidably receivable within longitudinally aligned bolt holes 19 and 25. To facilitate the removal of each bolt 26 in either longitudinal direction of the coupling 1, each bolt 26 may be provided with threaded extremities 27 and 28. With each bolt 26 received by aligned bolt holes 19 and 25, a pair of internally threaded nuts 29 and 30, possibly in combination with washers 31 and 32, may be engaged with the threaded rod ends 27 and 28 and employed to draw the coupling means 2 and 4 into the converged or connected position shown in FIG. 1.

Thus, each bolt 26 serves to interconnect longitudinally aligned fastener receiving portions 19 and 25 of the first and second coupling means, respectively.

Each bolt 26 and its associated nuts 29 and 30 is operable to induce convergence of the first flange means 10 and second flange means 24 of the first and second coupling means, respectively, and thus also induce convergence of the body means 7 and 21 and the overall coupling means 2 and 4.

Assembly 1 also includes seal means 33, shown in side elevation and partial cross section in FIG. 1 and shown in plan view in FIG. 2.

Seal means 33 includes an annular seal or gasket 34 which may be fabricated of conventional gasket material such as ductile metal, soft steel, plastic or other materials used for sealing or gasket purposes.

As shown in FIG. 1, seal 34 may be somewhat ovoid or elongate in the longitudinal direction of coupling means 1.

Seal or gasket 34 is intended to be sealingly received within mutually facing, and generally mirror image related, recesses 35 and 36 carried by the first coupling means 2 and second coupling means 4, respectively. Seal-receiving groove 35 extends coaxially about the central axis of passage 8 and is formed on a generally radially extending, flange face 37 of first coupling means 2. Similarly, seal-receiving groove 36 extends coaxially about the central axis of passage 22 and is formed on a generally radially extending flange face 38 of second coupling means 4.

As shown in FIGS. 1 and 2, seal means 33 is provided with a bifurcated alignment means or web 39. Web 39 may be generally sheetlike in nature, and generally oriented with a plane extending perpendicular to the central axis of passage means 8 and 22. Alignment web 39 is connected with an outer edge portion 40 of seal 34. In the arrangement shown in FIGS. 1 and 2, alignment web 39 projects downwardly from the underside 40 of seal 34 and is generally rigid.

Alignment web 39 is provided with a pair of outwardly diverging alignment fingers 41 and 42 which are located in a mirror image fashion and disposed generally symmetrically with respect to the common central axis 43 of seal 34 and passage means 8 and 22. Fingers 41 and 42 define a generally V-shaped, downwardly diverging camming edge 44. Camming edge 44 is designed to cooperate with a stud bolt, for example, lowermost bolt 26 of the FIG. 1 assembly, so as to substantially position the seal 34 in generally coaxial alignment with the seal-receiving grooves 35 and 36.

In the arrangement shown in FIG. 2 where the root 45 of edge 44 conformingly engages the upper periphery of lower bolt 26, this alignment is facilitated by ensuring that the distance between the axis 43 of the seal 34 and the root 45 are substantially the same as the distance between the axis 43 of the passage means 8 and 22 and the upper periphery of the lower bolt 26. Obviously, however, different modes of abutting engagement between web 39 and a bolt 26 may be effected while maintaining the alignment function. It is merely necessary to ensure that edge 44 engages a bolt 26 to cause the central axis of seal 43 to be pivotal to a position of coincidence with the central axis of the aligned grooves 35 and 36.

With the alignment means 39 engaged with the lowermost bolt 26, minor lateral rocking of the seal 34 will serve to move the seal 34 into seatable engagement with seal groove or seats 35 and 36.

The positioning of the seal 34 is facilitated by a handle means 46. Handle means 46 projects generally radially outwardly from the upper side of seal 34, i.e. generally diametrically opposite to the direction of projection of the alignment means 39.

In the FIG. 2 orientation, handle means 46 is defined by a web portion 47 connected with, and projecting radially upwardly from, an upper portion 34a of seal 34. An apertured grip 48 is mounted on web 47 so as to be located radially above the upper extremities of the flange portions 10 and 24 of the coupling means 2 and 4. Thus, a diver gripping the centrally apertured grip 48 may lower the seal means 33 between the appropriately spaced, first and second coupling means 2 and 4 and position the web 39 in aligned cooperation with a previously inserted lower bolt 26. When the camming slot 44 is fully or centrally engaged with the upper periphery of the bolt 26, the diver can "lock" the aligned position of seal 34 by passing an upper stud bolt 26 through an aligning aperture 47a formed in web 47. Aperture 47a is sized to slidably receive a bolt 26 and then substantially prevent lateral movement of seal means 33 through engagement of the edge of the aperture 47a with the sides of the received bolt 26.

The final aligning of seal 34, prior to the insertion of the alignment locking bolt, may be effected by a diver gripping grip 48 and laterally "rocking" the gasket 34 about the pivot defined by the lower stud bolt 26 until the upper bolt 26 can pass through the aperture 47a. As will be appreciated, aperture 47a is positioned relative to edge 44 to ensure that the engagement of the upper and lower bolts with aperture 47a and edge 44 will coaxially align seal 34 with groove 35. Aperture 47a and edge 44 will tend to impede or prevent "skewing" or "canting" of seal 34 relative to groove 35 and thus tend to maintain parallelism between the elements.

Coupling 1 also includes a plurality of screw-type, flange-jacking members 49.

As shown in FIGS. 1 and 2, each jacking element 49 comprises an externally threaded bolt 50 threadably mounted in an aperture 51 of leg 20 of flange means 10.

As shown in FIG. 2, three such jacking elements 49 are provided. These elements are displaced circumferentially about the flange means 10 and spaced generally circumferentially from, or generally interspersed with, the fastener-receiving openings 19.

The bolts 50 and their associated mounting holes 51 extend parallel to the central axis 43 of the assembly.

Each jacking element 49 is provided with an abutment defining end 52. Each abutment defining end is operable to abuttingly engage a generally radially extending flange face 53 of the second flange means 24.

By screwing a bolt 50 in and out of its mounting hole 51, the longitudinal position of the abutment 52 may be appropriately adjusted between the first flange means 10 and the second flange means 24. As will be hereinafter described, the jacking elements 49 serve to facilitate the obtaining of the desired spaced and/or parallel alignment between the flange faces 37 and 38 of the coupling means 2 and 4.

Each bolt 50 is threaded so as to move away from the coupling means 4 as it withdraws its abutment 52 from the flange face 53 and is axially movable to permit complete convergence of the grooves 35 and 36 into sealing cooperation with opposite sides of the seal 34.

In other words, the bolts 50 may be manipulated or withdrawn from abutting engagement with the second coupling means 4 so as to permit the bolts 26 and their associated nuts to be manipulated and induce convergence of the flange means 10 and 24 and thus cause the grooves 35 and 36 to sealingly engage opposite, longitudinally facing sides of the seal means 34.

MODE OF OPERATION OF FLANGE-TYPE COUPLING

The manner in which the coupling 1 may be manipulated in a submerged or underwater environment to effect the joining of conduit or pipeline sections adjacent a submerged surface is shown schematically in FIGS. 3-7.

Figure 3:
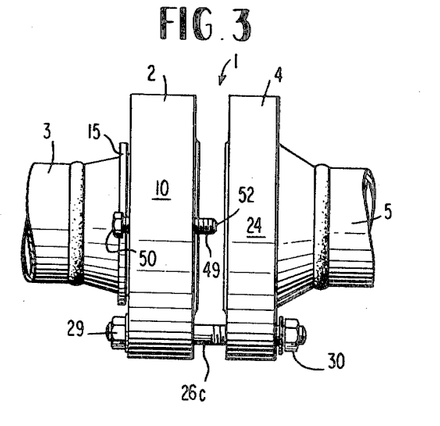
FIGS. 3-7 provide a schematic representation of the sequence or mode of installation of the FIG. 1 coupling.
Figure 4:
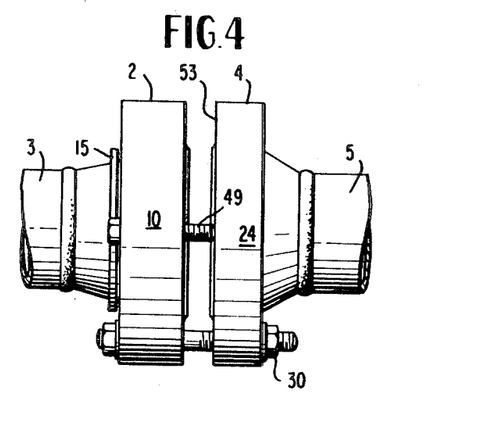
Figure 5:
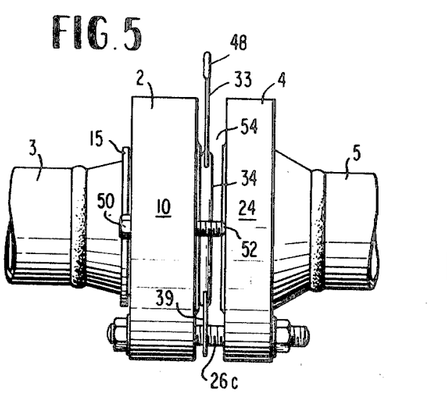

FIG. 3 illustrates the components of the coupling 1 where the coupling means 2 and 4 are somewhat separated.

As shown in FIG. 3, the conduit means 3 and 5 are disposed in general longitudinal alignment. The position in the conduit means 3 and 5 in this general alignment may be implemented by a diver or by a diver assisted by other divers or hoisting lines extending upwardly to hoisting gear on floating vessel means.

With the conduit means 3 and 5 generally aligned, the rotatable first flange manes 10 may be rotated on the body 7 of the coupling means 2 to generally longitudinally align the bolt-receiving holes 19 with the bolt-receving holes 25 and position the jack means 49 to provide the desired jack action. With the bolt-receiving holes 19 and 25 thus generally aligned, the diver or divers may loosely install two, side-located, studbolts 26 and a lowermost studbolt 26. As shown in FIG. 2, the side bolts are generally designed 26a and 26b and the lowermost studbolt is generally designated 26c.

FIG. 3 illustrates the "loose" installation of the representative lower studbolt 26c, with the nuts 29 and 30 only partially secure.

As will be appreciated, the bolt-receiving holes 19 and 25 will be somewhat "oversize," in diameter, with respect to the shanks of the studbolts 26 so as to permit the initial positioning of the studbolts in the generally aligned openings 19 and 25, even though there may be some degree of misalignment of the coupling means 2 and 4. In other words, the bolts may be inserted in holes 19 and 25 even when those these holes are not absolutely coaxially aligned.

Either before or after the installation of the studbolts 26a, 26b and 26c, the screwjack bolts 50 are advanced toward coupling means 4 in their threaded mounting holes 51 so as to position the abutment means 52 at a desired stop or alignment position intermediate the coupling means 2 and 4. This general positioning of the abutment means 52 is indicated in FIG. 3.

With the side and lower studbolts installed, and with the abutments 52 appropriately positioned, the nuts 30 and/or 29 associated with the studbolts 26a, 26b and 26c are tightened so as to induce convergence of the flange means 10 and 24. This convergence will cause the face 53 to abuttingly engage the similarly positioned abutment means 52 of the three jacking bolts 50. Abutting engagement between the face 53 and the abutment means 52, as a result of the tightening of the nuts associated with the studbolts, will rigidify the assembly 1 with the seal-receiving faces 37 and 38 disposed in generally parallel and coaxially aligned relation as shown in FIG. 1.

With the assembly 1 rigidified in appropriate alignment, i.e. with the faces 37 and 38 locked in parallel and coaxial relation but axially spaced from the FIG. 1 position, a diver or divers, by manipulating the grip 48, will lower the seal means 33 downwardly into the cavity 54 between the body means 7 and body means 21. As shown in FIG. 2, the jack elements 49 and the side studbolts 26a and 26b are spaced so as to permit this manipulation of the seal means 33.

The diver lowers the seal means 33 until the guide or cam slot 44 is disposed in centered alignment with the lower studbolt 26c as shown in FIG. 2. This completed installation is illustrated in side elevation in FIG. 5.

With the seal means thus generally aligned with the assembly 1, completed alignment may be obtained and "locked" by inserting a top stud bolt 26d, The studbolt 26d intersects the alignment aperture 47a formed in web means 47 of seal means 33. With the top studbolt 26d intersecting the alignment aperture 47a, coaxial alignment of the seal 34 with the seal-receiving grooves 25 and 36 is assured.

As will be appreciated, the passage of the studbolt 26d through the alignment aperture 47a may be effected with the diver grasping the grip 48 and making appropriate lateral adjustments in the position of the gasket 34 by "rocking" the seal means 33 about the pivot defined by the lower studbolt 26c.

Figure 6:
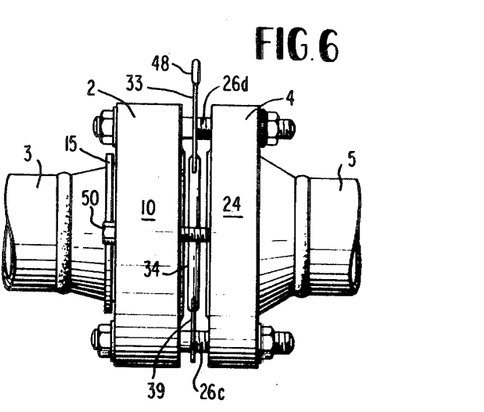

The completed installation of the top studbolt 26d is illustrated in FIG. 6.

With the gasket 34 secured in its aligned position, the diver or divers at the submerged site may install the remaining studbolts 26 and unscrew or "backoff" the jacking bolts 50 so as to move the abutment means 52 away from the coupling means 4. With the abutment means 52 withdrawn from abutting engagement with face 53, the nuts associated with the studbolts 26 may be tightened so as to cause convergence of the seal-receiving grooves 35 and 36 into sealing cooperation with opposite sides of the gasket or seal 34.

Figure 7:
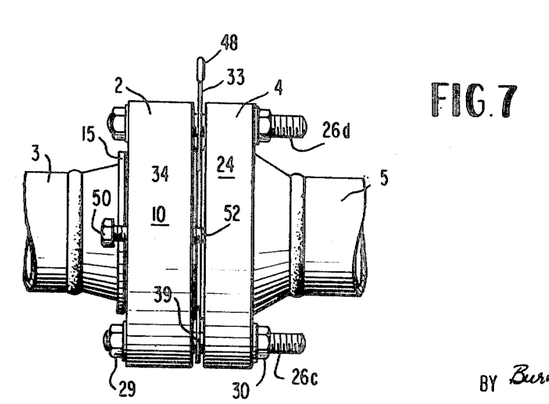

The withdrawing of the abutment means 52 and the tightening of the nuts associated with the studbolts 26, while independently effected, is preferably accomplished in such a manner as to retain the general rigidity assembly and parallel alignment of the faces 37 and 38. This maintenance of rigidity and alignment may be effected by sequentially withdrawing the abutment means 52 to a slight extent and then tightening the nuts associated with the studbolts to take up the "slack" occasioned by the withdrawing of the abutment means 52. This mode of manipulation may be repeated on a cyclic basis until the connecting of the coupling means 1 is completed as shown in FIGS. 1 and 7. Alternatively, divers, under some circumstances, may withdraw the bolts 52 while concurrently tightening the nuts associated with the studbolts 26 so as to main generally constant rigidity in the assembly 1 during the seal-engaging operation.

The convergence of the flanges 10 and 24 is fairly small in magnitude in comparison with the overall longitudinal dimension of the conduit portions 3 and 5. Existing "slack" in conduit portions 3 and 5, the existence of a telescoping joint in either of conduit portions 3 or 5, the generally movable nature of one of the conduit portions, or a variety of other conditions, will permit the convergence of the coupling members as described in the sequence shown in FIGS. 4-7.

As will be appreciated, the independently operable character of the jack means 49 and securing means 26 enables a diver or divers to maintain complete control at all times over the relative orientation between the coupling members 2 and 4. Any minor misalignment which may have existed at the start of the coupling operation can be corrected and the engendering of further error during the seal-engaging operation avoided.

Further, the abutment means 52 provide pivot points engageable with the coupling means 4 so as to enable the circumferentially displaced studbolts to induce relative pivotal movement of the coupling means 2 and 4 into an appropriate degree of alignment.

When it becomes appropriate to remove the seal means 33 for servicing or gasket replacing services, the sequence of FIGS. 4-7 may be repeated in reverse order to effect the removal of the seal means 33. The installation of the new seal means 33 or replacement unit may be effected by then reimplementing the steps illustrated in FIGS. 4-7.

When the jackbolts 50 are employed to induce separation of the coupling means 2 and 4, the securing ring 15 provides a reaction surface 18 to enable a pushing force to be transmitted between the coupling means 2 and 4.

ALIGNMENT FUNCTION OF JACK UNITS

The selective axial adjustability of the abutment means 52, in combination with the mounting of the jack units 49 for selective rotation about the body means 7 affords a unique coupling alignment concept.

Returning again to FIG, 3, a diver or divers may be confronted with coupling means 2 and 4 disposed in a somewhat canted, "skewed," or otherwise nonaligned condition.

In order to restore the coupling means to a suitable degree of alignment, with the grooves 35 and 36 generally parallel to each other, it may be necessary to reorient coupling means 4 so to cause the groove 36 to become parallel to the groove 35.

Either by a sense of feel, or possibly through visual observation, a diver or divers would be able to determine the nature of the misalignment between the coupling means 2 and 4. In many instances, such misalignment would result from the conduit means 3 and 5 lying on a submerged surface with their axes mutually inclined such that the planes of the groove bearing faces 37 and 38 were generally converging in one direction laterally of the conduit means 3 and 5.

Once such a misalignment condition was detected, the diver or divers could then orient flange 20 so as to position two jack means in generally superposed alignment on the side of the coupling assembly in the direction of convergence of the faces 37 and 38. By then advancing the two screwjacks 50a and 50b as shown in FIG. 2, to position the abutments faces 52 at the same longitudinal distance from the flange 20, the abutment means 52 of the screwjacks 50a and 50b, when engaged with the face 53, would define a generally vertical pivot axis between the coupling means 2 and 4.

With the pivot axis thus defined, and extending generally parallel to an intersection defined by planar extensions of the faces 37 and 38, the bolts 26 and their associated nuts may be manipulated so as to pivot one or the other or possibly both of the coupling means about the pivot axis and restore the coupling means to parallel alignment.

This mode of realignment is thus effected with optimum efficiency, and involves a manipulation of coupling members directly related to the nature of the misalignment.

The abutment 52 carried by the third jackscrew 50c shown in FIG. 2 would be positioned at the same axial distance from the flange 20 as the axial spacing of the abutment means 52 of the jackscrews 50a and 50b from flange 20 so to automatically interrupt the relative pivotal movement between the coupling means 2 and 4 when the parallel relationship between grooves 35 and 36 has been attained.

As will be appreciated, the mounting of the jack units 49 on the rotatable flange 20 enables the realignment pivot axis between the coupling means 2 and 4 to be selectively positioned by a diver or divers in accordance with the precise nature of the misalignment condition.

INSTALLATION OF SUBMERGED FITTING

It is now appropriate to consider the principal invention involving a unique manner in which a fitting such as a valve assembly T-fitting or other special conduit means may be installed at a submerged location.

Submerged conduits or pipelines are often initially installed employing pipelaying apparatus such as that shown in Hauber et al. United States Pat. No. 3,280,571 or in the Lawrence U.S. Pat. No. 3,390,532.

The Hauber et al. patent discloses an arrangement where lengths of a pipeline are interconnected or assembled on a pipelaying ramp formed on a lay barge. During this assembly operation, the "unlaid" portion of the pipeline is supported on roller assemblies on the ramp. The connected segments of the pipeline depend downwardly from the stern of the vessel and are supported by longitudinally spaced roller assemblies carried by a buoyant pontoon or ramp commonly termed a "stringer."

As the lay barge is moved forward, the pipeline moves slidably along the ramp of the lay barge and the buoyant pontoon, over the supporting roller assemblies, and generally toward a submerged surface on which it is to be laid.

A similar apparatus is featured in the Lawrence patent. However, the Lawrence patent additionally discloses a wheel-type tensioning arrangement which serves to control movement of the pipeline toward the submerged surface. This tensioning apparatus applies continuously effective tension to the pipeline on the lay barge, which tension is transmitted to the submerged portion of the pipeline depending from the floating vessel or lay barge toward the submerged surface.

In order to avoid an unnecessary encumbrance of the present disclosure, the pipe supporting and feeding arrangements of the Hauber et al. and Lawrence patents are herein incorporated by reference.

Under certain circumstances, it may be desirable to provide a fitting in a submerged pipeline such as a valve, T-fitting, or other special fitting. However, because of the location of welding apparatus, pipe coating apparatus, tensioning apparatus, or other equipment on the lay barge, it may be difficult to handle the pipeline on the lay barge with such a fitting installed.

Recognizing this particular problem, the invention is now extended to a concept which facilitates the incorporation of a fitting in a submerged pipeline, which pipeline has been positioned on a submerged surface with the fitting absent. The pipeline could have been laid by a variety of techniques, including those previously discussed in connection with the Hauber et al. and Lawrence patents.

The technique for installing a comprising: in a submerged pipeline will now be described with reference to FIGS. 8-11.

Figure 8:
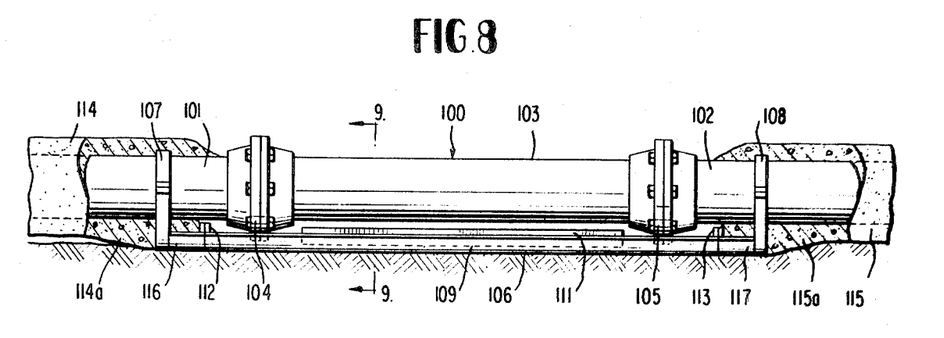
FIG. 8 depicts a phase of the principal invention, illustrating a section of a pipeline which was assembled on a pipelaying vessel and subsequently lowered to a submerged surface, and depicts a cement "weight coating," partially "broken away"

FIG. 8 illustrates the pipeline in the manner in which it was initially fabricated on the lay barge and then installed on a submerged surface.

The assembly 100 shown in FIG. 8 includes a first conduit portion 101 spaced axially from, but generally longitudinally aligned with, a second conduit means 102. The assembly 100 was lowered from a floating vessel means such as, for example, a floating vessel arrangement as described in the aforesaid Hauber et al. or Lawrence patents.

The assembly 100 additionally includes a removable conduit section or spacer member 103. Spacer member 103 may be connected to conduit 101 by a flange coupling 104 corresponding substantially to flange assembly 1 previously discussed. Another end of spacer 103 is connected to conduit 102 by another flange assembly 105 which may also correspond in structure to the previously described assembly 1.

A template 106 is radially displaced from the spacer 103, located beneath the spacer 103, and is connected at opposite ends to the conduit means 101 and 102. Template 106 may be connected by connecting means 107 to conduit 101 and by connecting means 108 to conduit means 102.

Figure 9:
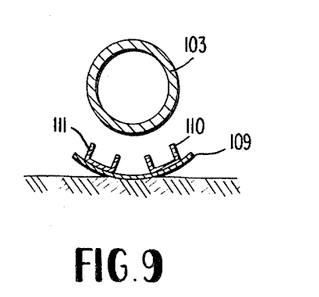
FIG. 9 provides a transverse sectional view of the FIG. 8 assembly as viewed along section line 9—9 of FIG. 8.

Template 106 may comprise a cylindrical shell corresponding to the cradle 1 described in Roberts U.S. Pat. No. 1,869,778. Fastening means 107 and 108 may comprise, for example, strap-type fasteners corresponding to the fastening elements 10 also described in the aforesaid Roberts U.S. Patent. As shown in FIG. 9, partially cylindrical cradle 109 of the template 106 may support a pair of longitudinally extending skids or rails 110 and 111. The axis of curvature of cradle 109 and the longitudinal axes of skids 110 and 111 extend generally parallel to the common axis of conduits 101, 102 and spacer 103.

If desired, the skid-bearing cradle portion 109 of template 106 may be detachably secured to the template ends as, for example, by detachable flange-type couplings 112 and 113, schematically shown in FIG. 8.

As is also shown in FIG. 8, conduit means 101 and 108 have been coated in a conventional manner with concrete "weight" coatings 114 and 115. These coatings may be tapered or enlarged at zones 114a and 115a to merge smoothly with the cylindrical outer peripheral portions 116 and 117 at opposite ends of the template 106.

With the concrete coating thus disposed so as to merge generally smoothly with the template shield 109, sliding transition of the assembly 100 of the roller assembly of the lay barge and buoyant ramp is facilitated. In this connection, it is contemplated that the disconnectable couplings 112 and 113, if employed, may be located on the upper side of the cradle 109 so as to avoid interfering with the passage of the assembly 100 along the pipe support defined by the roller cradles of the lay barge and buoyant ramp.

With the assembly 100 positioned on a submerged surface as shown in FIG. 8, the spacer means 103 may be removed by disconnecting the flange couplings 104 and 105 in the manner previously described in connection with the operation of the flange coupling 1.

Possibly with the assistance of a hoist line extending to a service boat—which may be a small boat different from the lay barge—the spacer 103 may be removed to the surface, once the couplings 104 and 105 have been disengaged.

Removal of the assembly 103 may be further facilitated by fabricating the body of the spacer 103 as an axially telescoping joint or conduit, possibly incorporating the telescoping joint arrangement featured in the U.S. Pat. application of William R. Rochelle, assigned to the assignee of the present application, filed May 7, 1969, and entitled "Method and Apparatus for Making Submerged Pipeline Connections." It is possible that a telescoping joint may be employed corresponding, in general, to the telescoping joint structure featured in the Augustine U.S. Pat. No. 2,399,312.

With the inclusion of the telescoping feature in spacer 103, the disconnecting of the coupling 104 and 105 would permit axial contraction of the spacer 103 so as to facilitate its being removed from between the mutually facing ends of the conduit sections 101 and 102.

Figure 10:
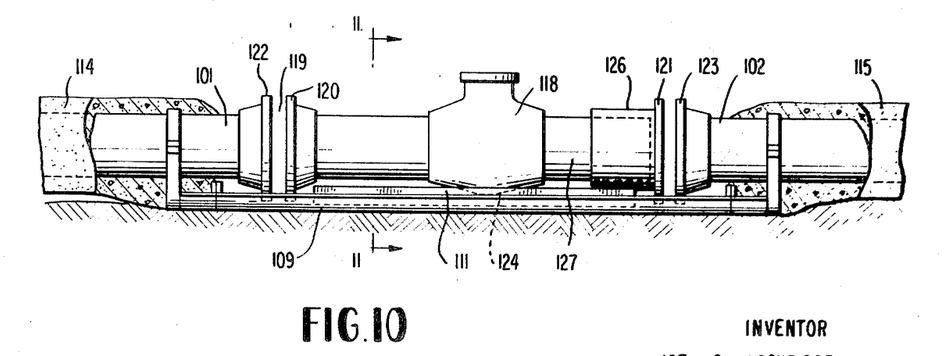
FIG. 10 illustrates the assembly of FIG. 8 after it has been positioned on a submerged surface and after a spacer unit has been removed and a fitting positioned in its place in aligned cooperation with a skid-type template.

With the spacer 103 removed, a fitting, possibly a valve-type assembly 118, shown schematically in FIG. 10, may be lowered from the aforesaid service boat to the gap 119 between the conduits 101 and 102. Opposite ends of the fitting 118 would be provided with coupling components 120 and 121 operable to sealingly engage coupling components 122 and 123 carried by conduit means 101 and 102, respectively.

In this connection, it will be recognized that coupling components 122 and 120 may comprise a flange-type coupling such as the assembly 1 previously described. Similarly, components 121 and 123 may cooperate to provide a flange coupling such as the assembly 1.

Figure 11:
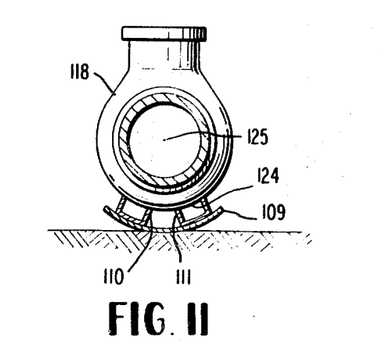
FIG. 11 provides a transverse sectional view of the FIG. 10 assembly as viewed along the section line 11—11 of FIG. 10.

Skids or rails 110 and 111 are fabricated so as to be aligningly engageable with a base portion 124 of the fitting 118. With the base portion 124 engaged with the aligning rails 111, the elevation of the center longitudinal axis 125 of fitting 118 is such as to permit the axis 125 to be pivoted about the base 124, which is supported by the rails 110 and 111, into coaxial alignment with the center longitudinal axis of the conduit portions 101 and 102.

Where the transverse cross section of the base 124 is generally circular as shown in FIG. 11, and particularly where the base 124 is fabricated more or less as a spherical segment, manipulations of the fitting 118 on the alignment rails 110 and 111 is greatly facilitated.

The fitting 118 may be slide longitudinally along the rails 110 and 111 so as to bring the coupling members at one end into aligned cooperation.

It is contemplated, for example, that the fitting 118 may be slid along the rails 110 and 111 so as to bring the coupling members at one end into aligned cto the left, as shown in FIG. 10, so as to bring the flange sections 120 and 122 into contiguous and aligned cooperation. These sections may be secured as generally described in connection with the securing of the flange assembly 1.

Thereafter, the flange components 121 and 123 may be interconnected in the manner generally described in connection with the interconnecting of coupling portions 2 and 4.

The interconnection of coupling components 121 and 123 may be facilitated by mounting flange 121 on a conduit portion 126 which is telescopingly secured on a cylindrical body portion 127 of the fitting 118. The telescoping joint defined by components 126 and 127 may correspond, for example, to the lockable telescoping joint featured in the aforesaid U.S. Patent application of William R. Rochelle, or may correspond to a telescopingly extensible connection as featured in the Augustine patent.

In other words, with the coupling components 120 and 122 secured, the telescoping section 126 may be extended to obtain the necessary convergence of coupling members 121 and 123, to complete the installation of the fitting 118 in sealed and fluid communicating relation with the axially spaced conduit sections 101 and 102.

As will be appreciated, in certain instances, the conduit means 101 and 102 may be provided with conventional "pigs" such as balls or plugs to temporarily seal the mutually facing ends of the conduit means 101 and 102 when the spacer means 103 is removed. Such "pigs," if employed, would seal the conduit means 101 and 102 against substantial entry of water during the substitution of the fitting 118 for the spacer 103.

Once the fitting 118 was installed and sealed in place, the "pigs" could be removed, in a conventional fashion, by being pumped through the completed installation. In this connection, it will be recognized that at least one of the "pigs" should be able to pass through the passage provided by the fitting 118 so that the "pigs" may be moved in the same direction through the submerged pipeline to an appropriate outlet.

The transition of "pigs" through a pipeline under the influence of fluid pressure applied to the pipeline end is a well-recognized phenomenon.

PRINCIPAL ADVANTAGES AND SCOPE OF INVENTION

The basic concept of installing a submerged pipeline with a spacer and template, with the template serving to align a fitting substituted for the spacer, is of basic importance in avoiding complications in the pipelaying operation and facilitating the submerged installation of the fitting.

The template is disposed so as not to interfere with the pipelaying operation and provide an assessable, reliable alignment device for supporting the fitting as it is being installed in the pipeline. The template prevents the fitting from sinking into a soft submerged surface and thus avoids substantial difficulties in fitting installation which could result from attempting to manipulate a fitting adjacent a submerged surface incapable of supporting the fitting.

The merging of the template with the concrete weight coatings of the pipeline ensures the smooth transition of the pipeline, with the spacer and template assembly, from a lay barge to a submerged surface.

The utilization of the jack-type flange couplings facilitates the safe removal of the spacer means and installation of the fitting while maintaining diver safety and ensuring proper alignment of the components of the underwater assembly.

The utilization of the telescoping joint in either or both the spacer means and fitting facilitates the removal of the spacer means and installation of the fitting by avoiding structural interference between the spacer means and the conduit means during the removal operation and by avoiding structural interference between the fitting and conduit means during the installation of the fitting.

The skids included in the template facilitate the longitudinal manipulation of the fitting so as to minimize diver effort.

Those skilled in the submerged coupling art and familiar with the disclosure of this invention may well recognized additions, deletions, substitutions, and other modifications which would fall within the purview of this invention.

For example, in the FIG. 1 flange assembly, the jacking screws may be mounted upon lugs projecting radially outwardly from the flange leg 20. Appropriate stop lugs may project radially outwardly from the flange 24 so as to provide alignment surfaces engageable with the jackscrews.

Jack manipulating arrangements other than screwjacks may be employed and coupling arrangements other than studbolts may be utilized.

It is also apparent that the configuration of the seal and the seal receiving portions of the coupling components may be substantially altered within the purview of the invention. Substantial variations with respect to the disclosed shape, cross-sectional configuration, wall thicknesses, etc., with respect to the FIG. 1 assembly, fall within the purview of the invention.

As will also be recognized, the gasket means 13 may be inserted between the coupling means 2 and 4 laterally or in an inclined fashion as well as being inserted in a generally vertical manner. Further, depending upon conditions encountered by the diver, the sequence, jack, and studbolt operations illustrated in FIGS. 3-7 may be substantially altered and modified. The numbers, shapes, structural character, locations and mode of operation of the jacks and fastener means may vary substantially.

With respect to the fitting installation concept, it will be apparent that the template and spacer may be fabricated with widely varying configurations so long as the spacer and template functions are retained.

For example, the template cradle 109 may be dispensed with so as to enable the template rails 110 and 111 to function as the template base. In this instance, suitable framing would be required to interconnect the rails 110 and 111 and mount these rails on the conduit sections 101 and 102.

The fitting installation technique may obviously be employed in connection with the installation of any substitute fitting or conduit section and may be practiced with couplings substantially or altogether different from the flange coupling described in connection with FIG. 1. Various telescoping spacer and fitting arrangements may be employed, or in some instances not utilized.

Further, the assembly 100 may be initially positioned by any available technique for placing conduit means on a submerged surface.

Having described the invention with respect to a preferred embodiment, it will be recognized that this embodiment as well as variations of the nature described above fall within the purview of the invention as set forth in the appended claims.

I claim:

1. A submergible apparatus comprising:
   first pipeline conduit means operable to extend generally longitudinally along and be generally contiguous with a submerged surface;
   second pipeline conduit means operable to extend generally longitudinally along and be generally contiguous with said submerged surface;
   removable spacer means interconnecting said first and second pipeline conduit means; and
   template means carried by and interconnecting said first and second conduit means, said template means being operable to be disposed generally beneath the elevation of longitudinal axes of said first and second conduit means and being operable to extend generally contiguously with and along said submerged surface, and being operable to cradle an under portion of and align fitting means substituted for said spacer means, with said fitting means being aligned longitudinally between said first and second conduit means.

2. A submergible apparatus comprising:
   first pipeline conduit means operable to extend generally longitudinally along and the generally contiguous with a submerged surface;
   second pipeline conduit means operable to extend longitudinally along and be generally contiguous with said submerged surface;
   removable spacer means interconnecting said first and second conduit means, said spacer means being operable to extend generally longitudinally along said submerged surface and being longitudinally contractable between said first and second conduit means; and
   template means carried by and interconnecting said first and second conduit means, said template means being operable to be disposed generally beneath the elevation of longitudinal axes of said first and second conduit means and being operable to extend generally contiguously with and along said submerged surface and being operable to cradle an under portion of and align fitting means substituted for said spacer means, with said fitting means being aligned longitudinally between said first and second conduit means.

3. A submergible apparatus comprising:
   first pipeline conduit means operable to extend generally longitudinally along the be generally contiguous with a submerged surface;

second pipeline conduit means operable to extend generally longitudinally along and be generally contiguous with said submerged surface;

template means carried by and interconnecting said first and second conduit means and operable to extend generally contiguously with and along said submerged surface at an elevation generally beneath the longitudinal axes of said first and second pipeline conduit means;

fitting means operable to be interconnected with said first and second conduit means; and said template means being operable to cradle an under portion of and aligningly support said fitting means longitudinally between said first and second conduit means.

4. A submergible apparatus comprising:

first pipeline conduit means operable to extend generally longitudinally along and be generally contiguous with a submerged surface;

second pipeline conduit means operable to extend generally longitudinally along and be generally contiguous with a submerged surface;

template means carried by and interconnecting said first and second conduit means and operable to extend generally contiguously with and long said submerged surface at an elevation generally beneath the longitudinal axes of said first and second pipeline conduit means;

fitting means operable to be interconnected with said first and second conduit means;

said template means being operable to cradle an under portion of and aligningly support said fitting means longitudinally between said first and second conduit means; and telescoping joint means operable to permit longitudinal extension of said fitting means between said first and second conduit means.

5. A submergible apparatus comprising:

first conduit means;

second conduit means;

template means carried by and interconnecting said first and second conduit means;

fitting means operable to be interconnected with said first and second conduit means;

said template means being operable to cradle an under portion of said fitting means and aligningly support said fitting means at an elevation longitudinally between said first and second conduit means and axially aligned therewith; and skid means carried by said template means and operable to facilitate longitudinal sliding movement of said fitting means between said first and second conduit means to facilitate the slidable manipulation of at least a portion of said fitting means along said template means into contiguous connectable engagement with at least one of said first and second conduit means.

6. A method of incorporating a fitting in submerged conduit mans, said method comprising:

lowering an assembly from floating vessel means with said assembly including longitudinally spaced first and second conduit means, removable spacer means interconnecting said first and second conduit means, and template means extending from said first conduit means toward said second conduit means and generally fixedly connected with and interconnecting said first and second conduit means;

disposing said assembly generally adjacent a submerged surface;

removing said spacer means from said assembly;

positioning fitting means in aligned and cradled cooperation with said template means and located generally longitudinally between said first and second conduit means; and in cooperation with said template means, placing said fitting means in connectable cooperation with said first and second conduit means.

7. A method of incorporating a fitting in submerged conduit means, said method comprising:

lowering an assembly from floating vessel means with said assembly including;

longitudinally spaced first and second conduit means, removable spacer means interconnecting said first and second conduit means, and template means extending from said first conduit means toward said second conduit means and generally fixedly connected with and interconnecting said first and second conduit means;

disposing said assembly generally adjacent a submerged surface;

removing said spacer means from said assembly;

positioning fitting means in aligned and cradled cooperation with said template means and located generally longitudinally between said first and second conduit means; and telescoping extending at least a portion of said fitting means to place said fitting means in connectable cooperation with said first and second conduit means.

8. A submergible apparatus comprising:

first conduit means;

second conduit means;

removable spacer means interconnecting said first and second conduit means;

template means carried by said first and second conduit means and operable to align fitting means substituted for said spacer means, with said fitting means being aligned longitudinally between said first and second conduit means;

first conduit coupling means connected with one of said conduit means;

second conduit coupling means connected with said spacer means;

passage means extending generally longitudinally of said first and second coupling means;

a plurality of coupling connecting means spaced circumferentially about said passage means, and operable to induce convergence of said first and second coupling means into fluid communicating and generally mutually sealed relationship; and a plurality of jack means carried by said first conduit coupling means and spaced circumferentially about said passage means and generally circumferentially displaced from said coupling connecting means;

said jack means being operably independent of said coupling connecting means, and operable to induce relative movement between said first and second coupling means with said coupling connecting means being substantially immobilized relative to said first coupling means.

9. A submergible apparatus comprising:

first conduit means;

second conduit means;

removable spacer means interconnecting said first and second conduit means, said spacer means being longitudinally contractable between said first and second conduit means;

template means carried by said first and second conduit means and operable to align fitting means substituted for said spacer means, with said fitting means being aligned longitudinally between said first and second conduit means;

first conduit coupling means connected with one of said conduit means;

second second conduit coupling means connected with said spacer means;

passage means extending generally longitudinally of said first and second coupling means;

a plurality of coupling connecting means spaced circumferentially about said passage means, and operable to induce convergence of said first and second coupling means into fluid communicating and generally mutually sealed relationship; and a plurality of jack means carried by said first conduit coupling means and spaced circumferentially about said passage means and generally circumferentially displaced from said coupling connecting means;

said jack means being operable independent of said coupling connecting means, and operable to induce relative movement between said first and second coupling means with said coupling connecting means being substantially immobilized relative to said first coupling means.

10. A submergible apparatus comprising:

first conduit means;

second conduit means;

template means carried by said first and second conduit means;

fitting means operable to be interconnected with said first and second conduit means;

said template means being operable to aligningly support said fitting means longitudinally between said first and second conduit means;

first conduit coupling means connected with one of said conduit means;

second conduit coupling means connected with said fitting means;

passage means extending generally longitudinally of said first and second submerged coupling means;

a plurality of coupling connecting means spaced circumferentially about said passage means, and operable to induce convergence of said first and second coupling means into fluid communicating and generally mutually sealed relationship; and a plurality of jack means carried by said first conduit coupling means and spaced circumferentially about said passage means and generally circumferentially displaced from said coupling connecting means;

said jack means being operably independent of said coupling connecting means, and operable to induce relative movement between said first and second coupling means with said coupling connecting means being substantially immobilized relative to said first coupling means.

11. An apparatus as described in claim 10 further comprising:

telescoping joint means operable to permit longitudinal extension of said fitting means between said first and second conduit means; and skid means carried by said template means and operable to facilitate longitudinal sliding movement of said fitting means between said first and second conduit means.